(No Model.)
R. R. SUTER.
REMOVABLE SPROCKET RIM.
No. 601,990. Patented Apr. 5, 1898.
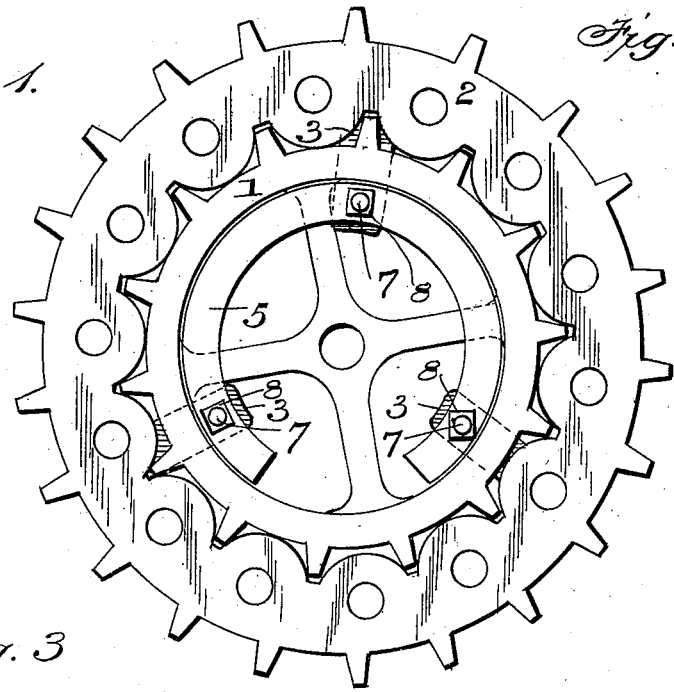
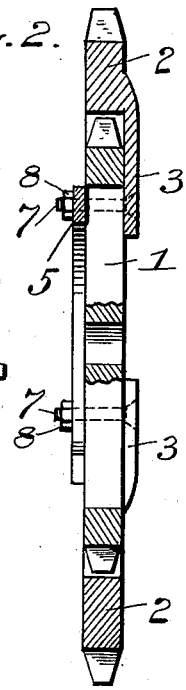
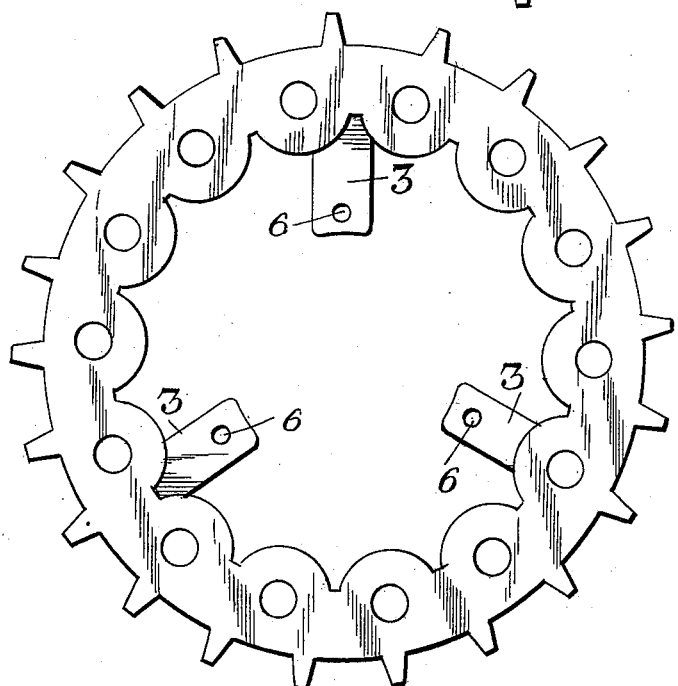
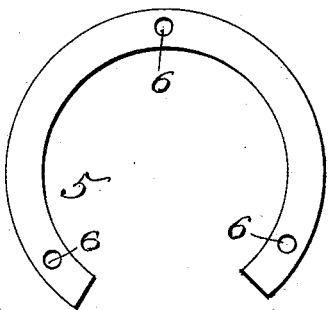
Witnesses:
F. L. Ourand
Jos. L. Coombs
Inventor:
Robert R. Suter,
by Sans Baggu
Attorneys.

UNITED STATES PATENT OFFICE.

ROBERT ROZELL SUTER, OF MEDIA, PENNSYLVANIA.

REMOVABLE SPROCKET-RIM.

SPECIFICATION forming part of Letters Patent No. 601,990, dated April 5, 1898.

Application filed July 14, 1897. Serial No. 644,630. (No model.)

*To all whom it may concern:*

Be it known that I, ROBERT ROZELL SUTER, a citizen of the United States, and a resident of Media, in the county of Delaware and State of Pennsylvania, have invented certain new and useful Improvements in Removable Sprocket-Rims; and I do hereby declare that the following is a full, clear, and exact description of the invention, which will enable others skilled in the art to which it appertains to make and use the same, reference being had to the accompanying drawings, which form a part of this specification.

My invention relates to improved means for increasing the speed of bicycles without varying the revolution or rotation of the shaft of the sprocket-wheel.

The invention consists, essentially, in a sprocket-rim provided with inwardly-extending lugs having apertures at the ends and a segmental clamping-plate and bolts so constructed that said rim will fit over the sprocket-wheel of a bicycle and be securely clamped to the spokes thereof by means of the lugs and segmental plate, as hereinafter fully described and claimed.

In the accompanying drawings, Figure 1 is a side elevation of a bicycle sprocket-wheel, showing my improved sprocket-rim applied thereto. Fig. 2 is a vertical sectional view of the same. Fig. 3 is an elevation of the rim detached. Fig. 4 is a similar view of the clamping-plate.

In the said drawings the reference-numeral 1 designates the sprocket-wheel of a bicycle of any ordinary or suitable construction.

The numeral 2 designates the sprocket-rim, larger in diameter than the sprocket-wheel, so as to fit over the same, and provided with inwardly-extending lugs 3 on one side, formed with apertures in the ends. The numeral 5 designates a segmental clamping-plate provided with holes 6, coinciding with the holes in the lugs, through which pass screw-bolts 7, provided with nuts 8. The said sprocket-rim 2 at its inner side is provided with a number of curved projections 9, corresponding in number with the teeth of the smaller sprocket, and between which projections said teeth engage. These projections bear against the small sprocket between the teeth thereof.

In practice the rim is placed over the sprocket-wheel, with the lugs 3 arranged or located between or at one side of the spokes of the sprocket-wheel, as seen in Fig. 1. The clamping-plate is now applied to the opposite side of the sprocket-wheel, bearing against the spokes thereof, and the bolts passed through the coinciding apertures in the plate and lugs and the nuts screwed on. By this means the sprocket-wheel will be securely clamped by the lugs and segmental plate of the rim and the latter be held securely in place.

The sprocket-wheel rim should be of such diameter as to fit snugly over the sprocket-wheel, with its inner edge resting against the sprocket of the wheel, so as to afford a bearing for the rim. This is not necessary, however, as the rim may be made considerably larger than the wheel and be held securely in place by the lugs and segmental plate.

The device will be very valuable to riders of bicycles, as it can be produced at a comparatively small cost and can be readily attached and detached for the purpose of increasing and decreasing the gear and correspondingly varying the speed.

The sprocket-chain of the bicycle will have its links made detachable, and a few extra links will be carried by the rider to be inserted when the rim is secured to the sprocket-wheel.

While I have described the clamping-plate as being secured to the lugs of the rim by bolts and nuts, it is obvious that it may be secured thereto by ordinary tap-bolts.

Having thus fully described my invention, what I claim is—

1. The combination with the sprocket-wheel, of the removable sprocket-rim, provided with inwardly-extending lugs, formed with holes near their ends, the segmental clamping-plate formed with coinciding holes and the screw bolts and nuts, substantially as described.

2. The combination with the sprocket-wheel, of the removable sprocket-rim formed at the inner side with curved projections corresponding in number with the teeth of the sprocket-wheel and bearing against said wheel between the teeth thereof, the inwardly-extending lugs formed with holes near their ends, the segmental clamping-plate formed with coinciding holes and the screw bolts and nuts, substantially as described.

In testimony that I claim the foregoing as my own I have hereunto affixed my signature in presence of two witnesses.

ROBERT ROZELL SUTER.

Witnesses:
WM. H. WOOD,
THOMAS B. HARTMANN.